United States Patent [19]

Gordon

[11] 4,400,451
[45] Aug. 23, 1983

[54] SOLAR ENERGY CONVERTER

[75] Inventor: Arnold Z. Gordon, Lyndhurst, Ohio

[73] Assignee: Diamond Shamrock Corporation, Dallas, Tex.

[21] Appl. No.: 259,917

[22] Filed: May 4, 1981

[51] Int. Cl.³ .............................................. H01M 6/36
[52] U.S. Cl. .................................... 429/111; 204/242
[58] Field of Search .................... 429/111; 204/290 R, 204/290 F, 242

[56] References Cited

U.S. PATENT DOCUMENTS

| | | | |
|---|---|---|---|
| 3,801,490 | 4/1974 | Welch | 204/290 F |
| 3,953,876 | 4/1976 | Sirtl et al. | 357/60 |
| 4,042,758 | 8/1977 | Weinstein et al. | 429/111 |
| 4,084,044 | 4/1978 | Heller et al. | 429/111 |
| 4,090,933 | 5/1978 | Nozik | 204/129 |
| 4,144,147 | 3/1979 | Jarrett et al. | 204/129 |

OTHER PUBLICATIONS

M. A. Butler et al., "Photoelectrolysis With YFeO$_3$ Electrodes", *J. Appl. Phys.*, vol. 48, p. 3070–3072, (1977).
A. B. Ellis et al., "Semiconducting Potassium Tantalate Electrodes", *J. Phys. Chem.*, vol. 80, pp. 1325–1328, (1976).
P. Salvador, "The Influence of Niobium Doping On The Efficiency of h-TiO$_2$ Electrodes In Water Photoelectrolysis," *Solar Energy Mat'ls*, vol. 2, pp. 413–421, (1980).
C. Stalder et al., "Photoassisted Oxidation of Water at Beryllium–Doped Polycrystalline TiO$_2$ Electrodes", *J. Electrochem. Soc.*, vol. 126, pp. 2007–2011, (1979).
M. Tomkiewicz et al., "Photoelectrolysis of Water With Semiconductors", *Appl. Phys.*, vol. 18, p. 21, (1979).
"Photo-Oxidation of Water at Barium Titanate Electrodes", Kennedy & Frise, Jr., *J. Electrochem. Soc.*, 123, 1683 (1976).
"Preparation and Czochralski Crystal Growth of the Iron Titanates, F$_e$TiO$_3$, Fe$_2$TiO$_4$, and Fe$_2$TiO$_5$", Ginely and Baughman, *Mat. Res. Bull.*, vol. 11, pp. 1539–1544, (1976).
"The Photoelectrolysis of Water Using Iron Titanate Anodes", Ginley and Butler, *J. Appl. Phys.*, 48, 2019 (1977).

*Primary Examiner*—Aaron Weisstuch
*Attorney, Agent, or Firm*—Bruce E. Harang

[57] ABSTRACT

Liquid-junction photoelectrochemical semiconductor cells adapted for providing electricity, fuel, chemicals and/or chemical energy, preferably solar cells, which utilize a photoactive true solid/solid solution semiconductor mixed metal oxide material bulk or film electrode. Useful electrolytes include liquid, sol, gel or a solid electrolyte system, e.g., a film of an ionomer or of a polymer solvated with a liquid electrolyte.

30 Claims, 5 Drawing Figures

SOLAR ENERGY CONVERTER

BACKGROUND OF THE INVENTION

This invention relates generally to liquid-junction semiconductor devices for use as photocells and in particular to such devices for use as solar cells for producing electrical energy from solar energy.

Concern over the continued availability as well as the continually escalating cost of fossil fuel energy sources has sustained high interest in the development of alternative energy sources, including solar power, which can be used to generate electricity. The devices most often considered for conversion of solar power into electricity are semiconductor devices, commonly called solar cells, which collect light, and generate photocurrent, in approximate proportion to the area of the photosensitive junction. This photosensitive junction must, therefore, be large to generate a useful current. The cost of manufacturing such devices depends in part on the area of the photosensitive junction and is presently too high to permit commercial exploitation of solar cells for other than limited and specialized applications.

Considerable effort has been devoted to finding ways to reduce the cost of semiconductor solar cell devices. A portion of this effort has been directed, as in U.S. Pat. No. 3,953,876, issued Apr. 27, 1976, to devices in wich the semiconductor material is deposited as a polycrystalline thin film on an expensive substrate rather than grown by the costly single crystal techniques used in earlier solar cells. A different approach that has generated enthusiasm is the liquid-junction semiconductor solar cells. The active part of these cells is a junction formed at a semiconductor-liquid interface. Because the junction forms spontaneously at the liquid-solid interface, the device promises to be less costly to manufacture as relatively costly epitaxy or diffusion procedures required for the single crystal or polycrystalline devices mentioned above are not needed to form the junction.

Four obstacles must be surmounted, however, before such cells can be exploited commercially. First, liquid-junction semiconductors are often not photochemically stable because photoexcitation produces electrons or electron holes at the semiconductor surface which may react with the semiconductor, causing corrosion of the semiconductor surface. This corrosion proceeds in a manner that degrades the desired characteristics of the semiconductor surface and is commonly manifested by decay of the photocurrent from the cell with operating time. An example of such a reaction with a CdS electrode, for example, is $CdS(s) + 2h^+ \rightarrow S^0(s) + Cd^{2+}$ (solvated) leading to the formation of a sulfur layer at the junction interface. One approach to solving this problem involves the use of, for example, a polysulfide-sulfide redox couple type of solution. Since the corrosion reaction $CdS(s) + 2h^+ \rightarrow S^0(s) + Cd^{2+}$ (solvated) proceeds at a higher electrode potential than the reaction $S^{2-}$ (solvated) $\rightarrow S^0 + 2e^-$, the sulfur-polysulfide couple consumes the electron holes responsible for the corrosion reaction before the potential for the corrosion reaction is reached. A second approach to resolving this problem is to use a material which has a corrosion reaction potential so high as to in effect be corrosion resistant. Such materials are, for example, certain transition metal oxide compounds. A specific example is titanium dioxide.

Secondly, the cost of single crystal semiconductor ·lectrodes is too high for commercial success. Several approaches have been tried to reduce the cost of single crystal semiconductor, especially chalcogenide, electrodes. One approach involves the electrolytic co-deposition of the electrode materials, e.g., cadmium and selenium, on an inert substrate. Another approach involves the anodization of a cadmium or bismuth substrate to form a chalcogenide semiconductor. These methods, however, do not produce materials which are cost competitive in the market place.

Thirdly, the band gap of the photoelectrodes must be closely attuned to the major energy portion of the solar spectrum, i.e., approximately 1.4 eV. This band gap is necessary not only to produce maximum power per surface area thereby increasing the output of a given cell but also to decrease the area of the liquid-solid junction needed and thereby lower the cost of the installation per unit of energy produced.

Finally, the liquid-junction semiconductor photocell needs to be one which is environmentally sound. Thus, while materials such as cadmium and selenium may produce potentially useful power outputs when used in solar cells, they are themselves highly toxic materials. Thus, they are not only environmentally harmful in use but also difficult and expensive to manufacture due to the necessary environmental considerations needed in the manufacturing processes of these materials.

SUMMARY OF THE INVENTION

It has been discovered that a liquid-junction semiconductor photocell can be produced using an electrode comprising a photoactive true solid/solid solution semiconductor mixed metal oxide material to adjust the band gap and/or optical properties of the electrode to more closely attune it to the major output portion of the solar spectrum as well as lowering the cost of production and providing a solar cell which is environmentally sound without the need for elaborate and expensive production procedures.

It has been found that this method of incorporating metal compounds as true solid/solid solutions produces film electrodes suitable for use in photoelectrochemical cells useful for the production of electricity having high efficiency, long life and which are economically suitable for the market place. Electrodes of the present invention avoid the cost and difficulties encountered in fabricating doped single crystal electrodes while functioning with good efficiency. Electrode material of the instant invention is, in fact, a true solid/solid solution, i.e., it is a uniformly dispersed mixture, at the molecular or ionic level, of one or more substances (the solute) in one or more other substances (the solvent) analogous, for example, to the more commonly thought of solution types such as methanol in water (a true liquid/liquid solution).

In an alternative embodiment of the instant invention, both electrodes can be immersed in the electrolyte contained in a containing means. In this instance, both electrodes may be opaque. Thus, the second electrode could be, for example, a material such as graphite.

The present invention is directed broadly to a liquid-junction photoelectrochemical semiconductor cell adapted for producing electricity, fuel, chemicals and-/or chemical energy using light radiation comprising: (I) a first electrode comprising a bulk or film electrode comprising: a photoactive true solid/solid solution semiconductor mixed metal oxide material having a band gap attuned to the specific region of the energy spectrum of the desired utilization and which in the case of a film electrode is disposed on a supporting electrically conductive substrate; (II) a second electrode comprising a conductive or semiconductive layer which is transparent to that region of the energy spectrum of the desired utilization of the first electrode (I) and which is disposed on a supporting conductive substrate, wherein said substrate is transparent to said region of the energy spectrum of said desired utilization, further characterized in that said second electrode, if a semiconductor, is of opposite conductivity type in relation to said first electrode; (III) an electrolyte disposed between, and in intimate contact with, both components I and II; (IV) a means for receiving the electrical energy produced; wherein component I is further characterized in that said semiconductor material thereof is a photoactive true solid/solid solution semiconductor material derived from precursor substances selected from the group consisting of elemental metals, non-oxide metal compounds, and mixtures thereof; said mixed metal oxide material corresponding to the formula $A_r{}^{va}M_y{}^{vm}O_z{}^{-2}$; where said formula represents the stoichiometry of the basic repeating unit lattice cell; where M is the combination of component (a) metal and component (b) metal; A when present is at least one different metal which does not substantially alter the optical absorption accruing from M in the above formula; O represents oxygen, said formula being further characterized in that r, y, z, va and vm are defined by the relationship $va(r)+vm(y)=2z$ wherein r equals a value of from 0 to 2, inclusive, y is from 1 to 2, inclusive, z is from 1 to 7, inclusive, va equals the positive valence of A, vm equals the positive mean valence of M and the valence of oxygen is $-2$; and wherein all said metal components of said formula are selected from the group consisting of boron, aluminum, tin, lead, the transition metals of families 1b through 7b, inclusive, and 8 of the periodic table of elements and the lanthanide series; wherein M in the above formula comprises: (a) 50 to 99.9 mole percent, based on the total metals mole fraction, of one or more component (a) metals; and (b) 0.1 to 50 mole percent, based on the total metals mole fraction, of one or more component (b) metals; with the proviso that said component (b) metals are different than said component (a) metals and with the further proviso that said component (a) metals, when in comparable oxide form, have a larger band gap than said component (b) metals, when said component (b) metals are in their comparable oxide form.

DETAILED DESCRIPTION

Figure 1:
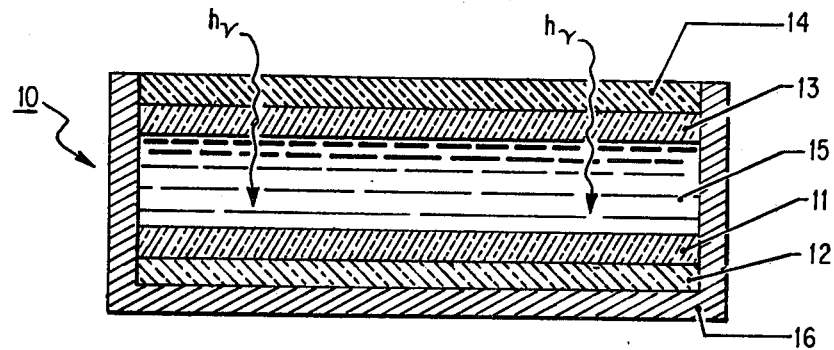
FIG. 1 is a representation, in vertical cross-section, of a liquid-junction semiconductor photocell utilizing a liquid electrolyte.

FIG. 1 shows a cell configuration 10 in cross-section which comprises a first electrode comprising a semiconducting layer 11 disposed on an electrically conducting substrate 12 and a second electrode comprising a semiconductive layer 13 having a conductivity type opposite that of the first electrode disposed against an electrically conductive light transparent substrate 14 with a liquid electrolyte 15 disposed between and in intimate contact with both the first and second electrodes. Also shown is a containing means 16. It is understood that there are electrical contacts (not shown).

Figure 2:
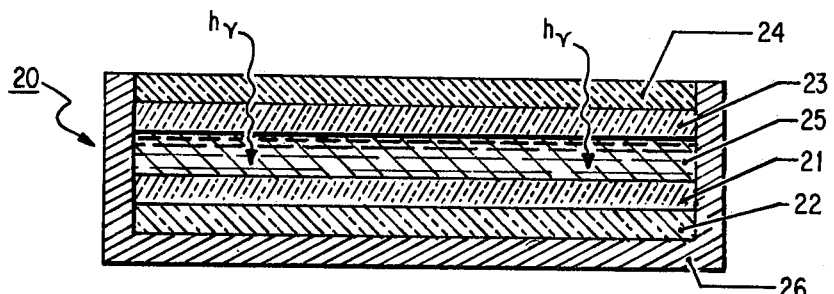
FIG. 2 is a representation, in vertical cross-section, of a liquid-junction semiconductor photocell utilizing a solvated ionomeric or polymeric electrolyte system.

FIG. 2 shows a cell configuration 20 in cross-section which comprises a first electrode comprising a semiconductive layer 21 disposed on an electrically conductive substrate 22 and a second electrode comprising a semiconductive layer 23 having a conductivity type opposite that of the first electrode disposed against an electrically conductive light transparent substrate 24 with a solid electrolyte system 25 disposed between and in intimate contact with both the first and second electrodes. Also shown is an encapsulating means 26. It is understood that there are electrical contacts which are not shown.

In FIGS. 1 and 2, the first electrode may be a bulk electrode, in which case there is no separate substrate layer, e.g., in FIG. 1 a bulk electrode would correspond to a single material (11) replacing the film and substrate (11+12) as shown.

Figure 3:
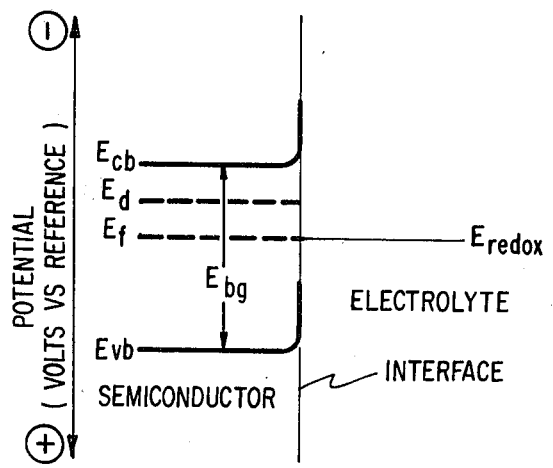
FIG. 3 is a schematic representation of the energy level relationship at the interface between a semiconductor electrode and an electrolyte.
Figure 4:
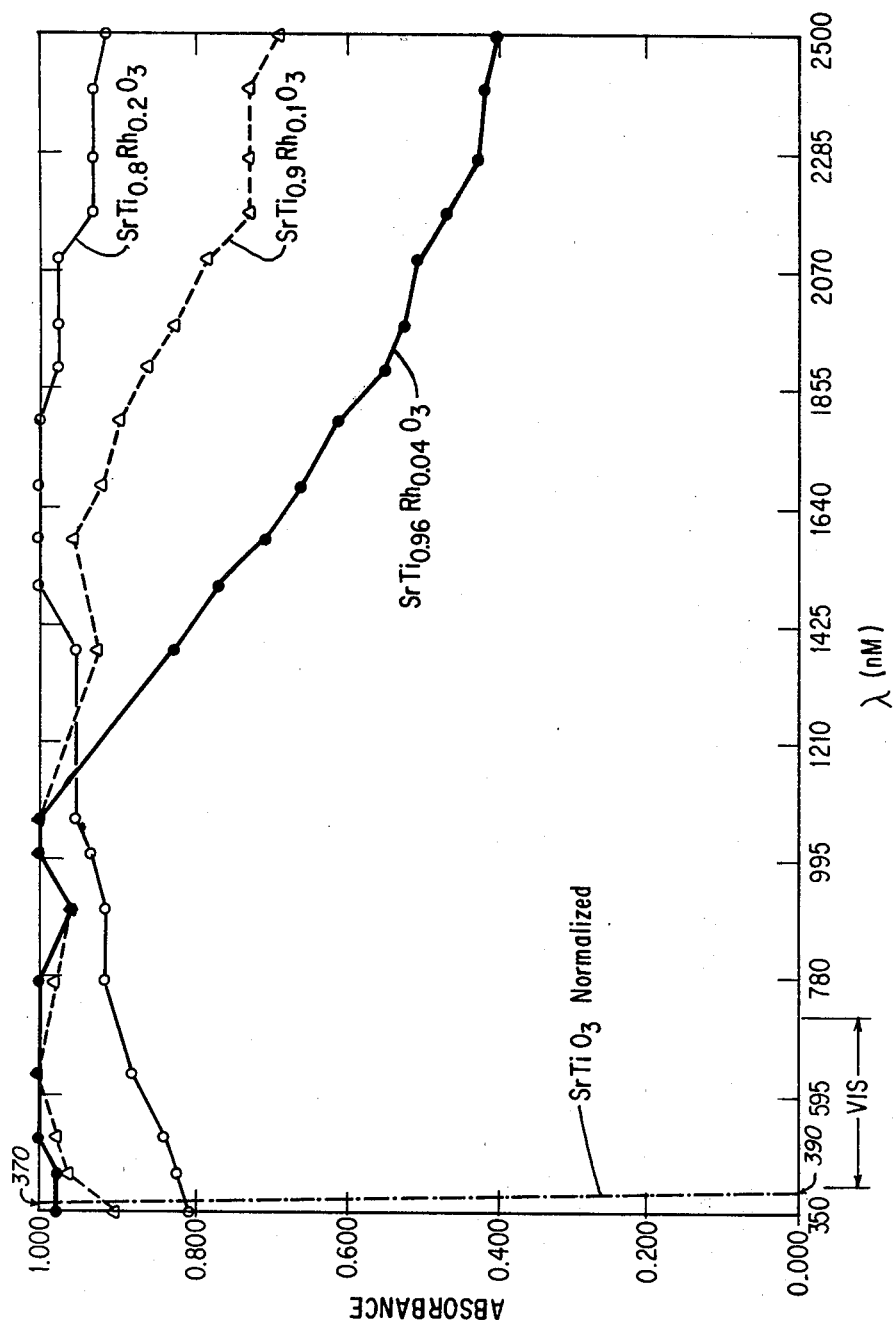
FIG. 4 is a graphic representation of changing the absorption edge by changing the amounts of ruthenium in a photoactive true solid/solid solution semiconductor mixed metal oxide material of the general formula $SrTi_{1-x}Rh_xO_3$.
Figure 5:
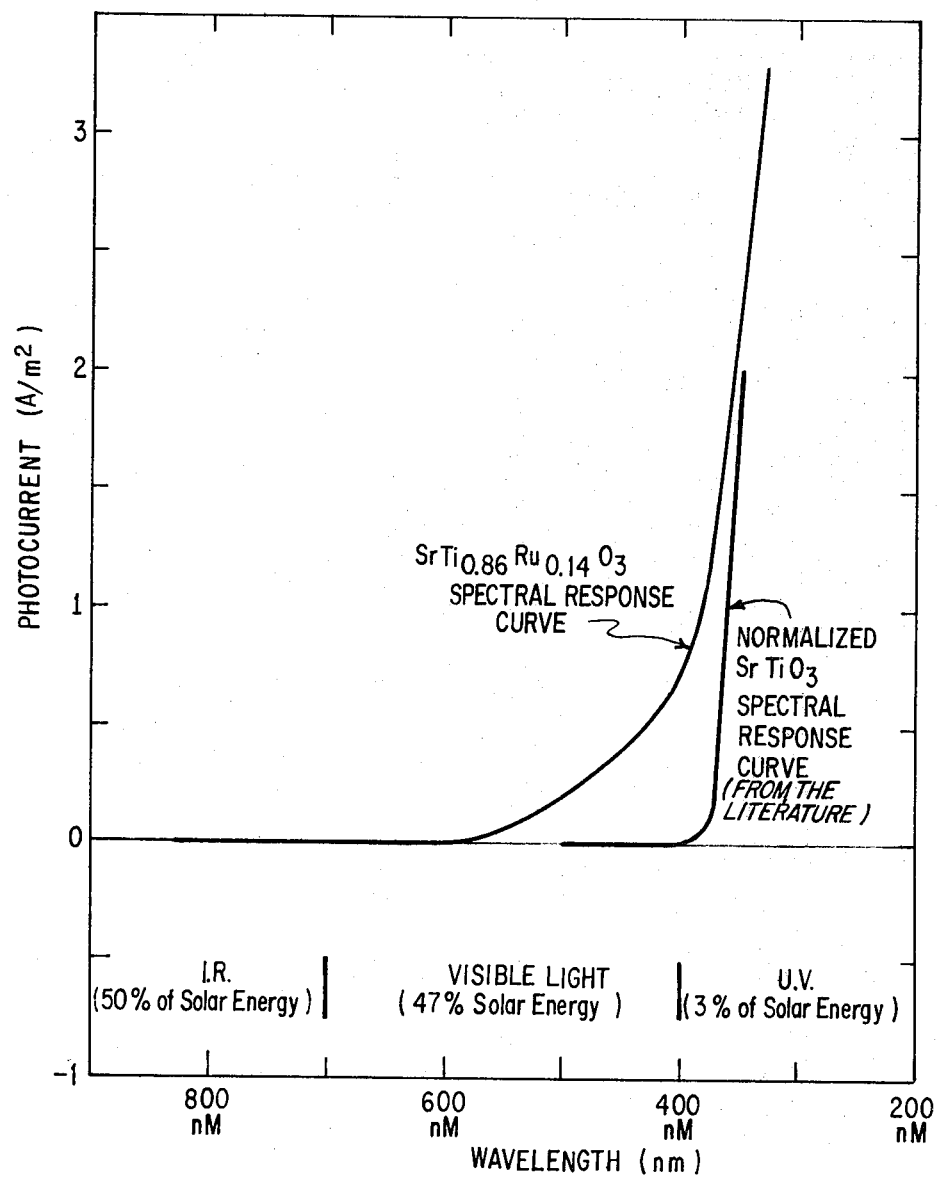
FIG. 5 is a graphic representation of the spectral response of $SrTiO_3$ compared to the spectral response of a photoactive true solid/solid solution semiconductor mixed metal oxide material of the formula $SrTi_{0.86}Ru_{0.14}O_3$. The $SrTiO_3$ curve is normalized from data presented in "Fundamental Absorption Edge of $SrTiO_3$," Redfield, D. and Burke, William J.; *Physical Review B*, Vol. 6, No. 8, Oct. 15, 1972.

The operation of the cells in both FIG. 1 and FIG. 2 is similar and, therefore, the operation of FIG. 1 will be understood to broadly describe the operation of FIG. 2. Light (hv) passing through the second electrode (13+14) and through the electrolyte (15) is absorbed by the first electrode semiconductive layer (11). This causes a photoelectrochemical half-cell reaction to take place between the first electrode and the electrolyte and mandates an electrochemical half-cell reaction of the opposite form to take place between the second electrode and the electrolyte. Conversely in the embodiments where the second electrode (13+14) is also a semiconductor, the light absorbed by the second electrode semiconductive layer (13) causes a photoelectrochemical half-cell reaction to take place between the second electrode and the electrolyte, and mandates an electrochemical half-cell reaction of the opposite form to take place between the first electrode and the electrolyte. Thus, the electricity produced by each half-cell reaction is removed via electrical contacts (not shown) to an electrical utilization system such as, for example, a battery (also not shown). There is, however, in cases where only electricity is produced, no net mass change because the results of the two half-cell reactions balance each other out. It is understood that in the embodiments where fuel and/or chemicals, with or without electricity production, are produced, a net mass change does occur. It is further understood that the description above is for those embodiments where both first and second electrodes are semiconductors. Where the first electrode is a semiconductor and the second electrode merely a counter electrode (i.e., not a semiconductor), the half-cell reaction of the first electrode and electrolyte is balanced by a Schottky barrier type phenomenon between the second (counter) electrode and the electrolyte. FIGS. 3 through 5 will be discussed more particularly hereinbelow.

FIRST ELECTRODE

True solid/solid solution photoactive semiconductor mixed metal oxide material film electrodes suitable for use as first electrodes provide improved spectral response and efficiency by combining at least two metal components all of which are derived from precursor substances selected from the group consisting of elemental metals, non-oxide metal compounds, and mixtures thereof. For convenience, two of the metal component precursors, and thus also the metal themselves (when referring to "M" as discussed hereinbelow), are herein grouped together as components (a) and (b). Component (a) precursors may be defined as non-oxide precursor substances, which in their oxide form, each have a band gap larger in size than any component (b) precursor, when component (b) precursor is in comparable oxide form. Stated the other way, the one or more component (b) precursors may then be defined as non-oxide precursor substances each of which in its oxide form has a narrower band gap than any component (a) in comparable oxide form. Components (a) and (b) are combined to form a true solid/solid solution. Generally, component (a) and (b) precursors, being non-oxides, are elemental metals, non-oxide metal compounds or organometallic compounds as well as mixtures thereof, with the foregoing compounds containing, in addition to the metallic elements, other elements which are not exclusively oxygen. Suitable components (a) and (b) are those components containing metals selected from a group consisting of boron, aluminum, tin, lead, the lanthanide series and the transition metals. (As used throughout the specification and claims, the term "transition metal" means any metallic element of groups 1b, 2b, 3b, 4b, 5b, 6b, 7b, or 8 of the periodic table of elements; and lanthanide series means any one of the elements numbers 58 through 71, inclusive, as they appear on pages 448 and 449 of the *Handbook of Chemistry and Physics*, Chemical Rubber Publishing Company, Cleveland, Ohio (1963)). More particularly, the metals of the components (a) and (b) precursors used to produce the true solid/solid solution photoactive semiconductor mixed metal oxide material of the instant invention are such that can result in the preparation of mixed metal oxide materials, the totality of which materials can be represented by the general formula $A_r{}^{va}M_y{}^{vm}O_z$. In the formula, M is a combination of component (a) metal and component (b) metal and A, when present, is at least one different metal which does not effectively and/or substantially alter the optical absorption in the electromagnetic region of interest accruing from M, and O represents oxygen; further characterized in that r, y, z, va and vm are defined by the relationship $(va)(r)+(vm)(y)=2z$ wherein r is from 0–2, inclusive, y is from 1–2, inclusive, and z is from 1–7, inclusive, va equals the positive valence of A, vm equals the positive mean valence of M and the valence of oxygen is $-2$.

The A in the above general formula may be a single metal or A may be a combination of up to three different metals. In the formula, A may be any substantially optically passive metallic ion (as defined below), such as, for example, zinc, strontium or lanthanide metals, wherein the lanthanide metals are any one of the elements Nos. 58 through 71, inclusive. The preferred metal or metals A are strontium, zinc or one or more of the lanthanides.

In the above general formula, M is a combination of two to four different metals, preferably two different metals. The combination of metals is derived, as described above, so as to have at last one larger band gap and at least one narrower band gap metal compound. As an example, titanium and platinum are suitable, since $TiO_2$ has a larger band gap than $PtO_2$; so titanium is the component (a) metal while platinum serves as the component (b) metal.

It is understood that the above formula is used to represent the stoichiometry of the basic repeating unit lattice cell, so the values of r, y and z are often described in fractional notation such as, for example, $SrTi_{0.67}Ru_{0.33}O_3$. This type of notation represents the stoichiometry of the basic repeating unit lattice cell. This type of notation also allows for the most simple illustrative cell structure to be used to describe the material in question (see, for example, FIG. 1). Further discussion of how this type of notation is used can be found in, for example, *Structure, Properties and Preparation of Perovskite-Type Compounds*, Fransis S. Galasso, Pergamon Press, 1969. However, it is also understood that the formula $Sr_3Ti_2RuO_9$ is an equivalent expression of exactly the same compound. Thus, applicant realizes that using the more classical whole number formula format would result in values above those specified by applicant in his instant invention while in fact describing suitable compounds. Examples of suitable values of r, y and z and examples of the resulting formulae are, for example, $r=0$, $y=1$, $z=2$ and the final oxide compound corresponds to the formula $MO_2$; $r=1$, $y=1$, $z=3$ and the final oxide compound corresponds to the formula $AMO_3$; $r=2$, $y=2$, $z=7$ and the final oxide compound corresponds to the formula $A_2M_2O_7$; $r=0$, $y=2$, $z=3$ and the final oxide compound corresponds to the formula $M_2O_3$; $r=0$, $y=1$, $z=1$ and the final oxide compound corresponds to the formula $MO$. Other compounds having other final oxide forms are also possible. Some specific examples are, for example, $(Pd,Ca)O$ representing the form MO; $(Ti,V)O_2$ representing the form $MO_2$; $(Fe,Al)_2O_3$ representing the form $M_2O_3$; $K(Ta,Nb)O_3$ representing the form $AMO_3$ and $La_2(Ti,Ru)_2O_7$ representing the form $A_2M_2O_7$.

Representative component (a) precursors may be any elemental metal and/or other metal non-oxide compound which is soluble or can be made soluble, chosen from aluminum, boron, tin, lead, certain lanthanides or the transition elements which form true solid/solid solutions of the form $MO_2$, such as zirconium and niobium. Component (a) precursors may also be an elemental metal and/or other metal non-oxide compound which is soluble or can be made soluble, chosen from boron, aluminum, tin, lead, certain lanthanides or the transition metals which form true solid/solid solutions in the form $AMO_3$ such as, for example, titanium. Additionally, component (a) precursors may be an elemental metal and/or other metal non-oxide compound which is soluble or can be made soluble, chosen from aluminum, boron, tin, lead, certain lanthanides or the transition metals producing a material having the general formula $A_r{}^{va}M_y{}^{vm}O_z{}^{-2}$ (as defined above), wherein M is a mixture of a transition metal or tin or lead plus one or more other metals, chosen from boron, aluminum, tin, lead, certain lanthanides or transition metals. By the term "certain lanthanides" used herein to refer to component (a) metals is meant those lanthanides which have a band gap (as defined above) which is larger than any component (b). Component (a) comprises 50 to 99.9 percent based on the total metals mole fraction of M. Preferred component (a) precursors are non-oxide compounds of aluminum, niobium, lanthanum, tantalum, tin, titanium and zirconium, most preferably titanium. Some specific examples are titanium ethoxide, diethyl tin dibromide, zirconyl iodide and lanthanum chloride.

Metals of component (b) may be any one or more of the transition metals in families 1b through 7b and group 8 and/or of the lanthanide series elements 58 through 71, inclusive, and/or boron, aluminum, tin and lead as set out in the periodic table of elements, with the restriction that all component (b) metals must be different than component (a) metals. Component (b) comprises 0.1 to 50 percent based on the total metals mole fraction of M. Preferred component (b) precursors are those of the non-oxide metal compounds of iridium, manganese, chromium, iron, vanadium, platinum, rhodium and ruthenium, most preferably rhodium and ruthenium. Specific compounds suitable as component (b) precursors include, for example, ferrous sulfate, manganous acetate, ruthenium trichloride, rhodium nitrate and chloroplatinic acid.

Examples of preferred embodiments from which M may be derived are, for example, a non-oxide compound from the group niobium, lanthanum, tantalum, tin, titanium and zirconium, one or more of which is used together with at least one non-oxide metal compound of the group rhodium, ruthenium, iridium, manganese, chromium, iron, vanadium and platinum. Other combinations of non-oxide metal compounds selected from the group boron, aluminum, tin, lead, the lanthanide series and the transition metals are also suitable. Presently preferred compounds from which M may be derived are those consisting of two non-oxide metal compounds, one selected from the group niobium, lanthanum, tantalum, tin, titanium and zirconium and the other selected from the group rhodium and ruthenium. Specific examples of M are titanium-ruthenium, titanium-rhodium and zirconium-chromium.

The A in the above general formula may be any substantially, optically passive metal (as defined below) such as, for example, zinc, strontium or one of the lanthanide series metals. It is to be understood that the materials used as A must meet the same requirements as precursors components (a) and (b) as far as composition and solubility. This is exemplified, for example, in the illustrative embodiment 1. Photoactive semiconductor mixed metal oxide materials now produced may be used for both n-type and p-type photoactive semiconductor materials; alternatively, the p-type material when used in a n-p solar cell may be a material such as PdO, CoO, or one of the various $Ln_2O_3$ (lanthanide series oxide) phases and/or solid/solid solutions of said $Ln_2O_3$ materials.

By the term "soluble" as used herein when referring to component (a) and (b) precursors is meant that such are generally easily dissolved in the solvent systems, generally with only simple mixing and without deleterious side effects such as solids precipitation or phase separations. By the term "being made soluble," as such is used herein, is meant that the component (a) and (b) precursors can be dissolved in solvent useful in the instant invention (and described in greater detail below), but such dissolution must be accomplished by special techniques to guard against deleterious phenomena such as phase separation or precipitation. A particular special technique is discussed hereinbelow. It is also understood that any component A precursor, if used, must also be "soluble" or be capable of "being made soluble" as described above. Thus, for example, precursors such as $SrCO_3$, as an A precursor, $RhCl_3$, as a component (b) precursor and $Ti(C_2H_5O)_4$, as a component (a) precursor are suitable. However, a compound such as $TiB_2$ is not suitable as it is not "soluble" in solvents or solvent systems as discussed hereinbelow, nor can it be "made soluble" by any known special technique in the solvents or solvent systems discussed hereinbelow.

Additionally, the photoactive semiconductor mixed metal oxide materials may be further altered as to its electrical and/or optical properties with dopants, procedures and treatments known and commonly used in the art. They include, for example, laser annealing, reduction and/or oxidizing atmosphere annealing and doping.

Applicant's general method of making the true solid/solid solution photoactive semiconductor mixed metal oxide material for the instant invention is as follows: (I) dissolving at least two different non-oxide metal ion precursors in liquid solvent; (II) separating said liquid solvent from said solution of step (I) by a separation means, leaving an intimately blended solid in non-oxide form; and (III) converting said intimately blended solid of step (II) to a true solid/solid solution mixed metal oxide by firing; thereby producing said photoactive semiconductor mixed metal oxide material. It is understood that in performing step (I) it may be necessary or advantageous to add additional solvent and/or add a quantity of different solvent after initial dissolution of one or more of the non-oxide metal ion precursors.

The first electrode may be a film electrode or may be a bulk electrode. In the case of a film electrode, a wide variety of substrates may be used. For example, the substrate may be a valve metal, a precious metal, other suitable metal, a ceramic, a glass or a composite of two or more of the above. In addition, the photoactive semiconductor electrode material can be sprayed either by flame or plasma spraying or dipped or painted onto said substrate. Additionally, coating methods such as, for example, vapor deposition may also be used. Generally, the film thickness used is from 100 angstroms to 200 microns in thickness. The thickness of the final film electrode may be acquired either as a single one-coat film or by coating the substrate with a number of coats to build up the desired thickness. The use of multiple coating operations allows for several important advantages to be incorporated into the film electrodes of the instant invention. One such advantage is that each layer may be treated individually with some type of post-deposition treatment. The post-deposition treatments possible with the instant invention include, for example, heating in a vacuum in a controlled atmosphere such as, for example, nitrogen, argon, hydrogen or oxygen or a combination thereof, submitting the electrode film to elevated temperature such as, for example, 200° to 1800° C., ion implantation of dopants and/or laser annealing. Pretreatment of the electrodes is also possible and in some cases preferred. The pretreatments possible include, for example, those listed above as suitable post-deposition treatment.

An example of a bulk first electrode would be a solid rod of photoactive true solid/solid solution semiconductor material immersed in an electrolyte.

SECOND ELECTRODE

The second electrode comprises both a transparent substrate and a transparent conductive or semiconductive layer. As herein and hereafter used, transparent means transparent to that portion of the electromagnetic spectrum to which the band gap of the first semiconductive material has been attuned. Additionally, it is understood that these materials are transparent, as defined above, at the thicknesses and in the geometric configurations used for the instant invention and not necessarily at all thicknesses. Thus, for instance, a gold film is transparent to most visible light when used in relatively thin layers (i.e., approximately 50 microns) but becomes opaque when relatively thick (i.e., 0.01 inch). Examples of suitable transparent substrates are, for example, glass, diamond, poly-(methylmethacrylate)-type polymers (Plexiglas ®), fiber filled resins, polyurethane elastomer, silicones, silicates, metal films and combinations thereof.

It is understood that while materials such as, for example, Plexiglas ® will work well as a transparent substrate, a combination of Plexiglas ® coated with silicone (organosiloxane polymer) is even better because the silicone protects the Plexiglas ® from adverse effects of weathering. It is also understood that known methods for coating Plexiglas ® with silicone, for example, are contemplated for preparing materials which are useful in the instant invention. For instance, a silicone elastomer dissolved in a volatile solvent may be coated onto a sheet of Plexiglas ® and the solvent allowed to dry thereby leaving a thin layer of silicone elastomer on the surface of said Plexiglas ®.

Suitable transparent semiconductive or conductive materials are, for example, ternary metal oxides such as $La_{0.01}Sr_{0.99}SnO_3$, vapor deposited gold metal film and chalcogenides. Materials such as metal mesh may also be used within the scope of the invention as a transparent second electrode. An example of such a mesh material is a gold-plated copper mesh of fine "hair-like" filaments.

It is also understood that in some cell configurations known in the art, carbon or graphite may be used as the second electrode. It is understood that the second electrode must be of the opposite conductivity type of the first electrode in the embodiment where both electrodes are semiconductors. Therefore both electrodes can not be identical.

Suitable transparent second electrodes are, for example, $La_{0.01}Sr_{0.99}SnO_3$ disposed as a film on Plexiglas ® and $Cd_2SnO_4$ disposed as a film on nylon or on a polyester (Mylar).

The transparent second electrode may be applied to the transparent substrate by various methods known in the electrode art. Examples of these methods are, for example, pressing, bonding, vapor deposition, fusing, electrolysis deposition and chemical vapor deposition.

ELECTROLYTE

The electrolytes used in the instant invention may be any commonly known to the art such as, for example, liquids, gels and sols. These materials must be transparent in the form and thicknesses used for a particular embodiment.

Examples of solvents for use in liquid electrolytes are, for example, water, ammonia, aqueous redox couple solutions and halogenated hydrocarbons such as Freon R-12 ®, Freon R-22 ® and Freon R-11 ®.

Examples of suitable redox-couples are, for example, $AsO_2^{-1}+4OH^{-1}=AsO_4^{-3}+2H_2O+2e$(1 m NaOH); $3Br^{-1}=Br_3^{-1}+2e$; $C_6H_4(OH)_2=C_6H_4O_2+2H^{+1}+2e$; $Cb^{+3}+H_2O=CbO^{+3}+2H^{+1}+2e$(6 m HCl); $Ce^{+3}+H_2O=CeOH^{+3}+H^{+1}+e$; $2Cl^{-1}=Cl_2(g)+2e$; $Co^{+2}+Co^{+3}+e$(3 m $HNO_3$); $Co(CN)_6^{-4}=Co(CN)_6^{-3}+e$; $Cr^{+2}=Cr^{+3}+e$; $2Cr^{+3}=Cr_2O_7^{-2}+3e$(2 m $H_2SO_4$); $Cr^{+3}=CrO_4^{-2}+3e$(1 m NaOH); $Cu^{+1}=Cu^{+2}+e$; $Fe^{+2}=Fe^{+3}+e$; $Fe(C_{12}H_8N_2)_3^{+2}=Fe(phenanthroline)_3^{+3}+e$; $Fe(CN)_6^{-4}=Fe(CN)_6^{-3}+e$(1 m $H_2SO_4$); $Fe(CN)_6^{-4}=Fe(CN)_6^{-3}+e$(0.01 m NaOH); $H_2=2H^{+1}+2e$; $H_2+2OH^{-1}=2H_2O+2e$; $Hg_2^{+2}=2Hg^{+2}+2e$; $2H_2O=O_2+4H^{+1}+4e$; $H_2O=O(g)+2H^{+1}+2e$; $3I^{-1}=I_3^{-1}+2e$; $Ni(CN)_3^{-2}+CN^{-1}=Ni(CN)_4^{-2}+e$; $4OH^{-1}=O_2+2H_2O+4e$; $H_2PO_2^{-1}+3OH^{-1}=HPO_3^{-2}+2H_2O+2e$; $H_3PO_2+H_2O=H_3PO_3+2H^{+1}+2e$; $Pb^{+2}+2H_2O=PbO_2+4H^{+1}+2e$; $PdCl_4^{-2}+2Cl^{-1}=PdCl_6^{-2}+2e$; Quinhydrone electrode, $H^{+1}$, a=1; $Rh^{+3}+H_2O=RhO^{+2}+2H^{+1}+e$; Ru(III)=Ru(IV)+e(HCl); $S^{-2}+6OH^{-1}=SO_3^{-2}+3H_2O+6e$; $SO_3^{-2}+2OH^{-1}=SO_4^{-2}+H_2O+2e$; Sn(II)=Sn(IV)+2e(0.1 m HCl); Sn(II)=Sn(IV)+2e(2 m HCl); $Tl^{+1}=Tl^{+3}+2e$; $V^{+2}=V^{+3}+e$; $V^{+3}+H_2O=VO^{+2}+2H^{+1}+1e$; $VO^{+2}+3H_2O=V(OH)_4^{+1}+2H^{+1}+e$; V(IV)=V(V)+e(1 m HCl); V(IV)=V(V)+e(1 m NaOH); $W(CN)_8^{-4}=W(CN)_8^{-3}+e$; and $Yb^{+2}=Yb^{+3}+e$. It is understood that these are the reactions at one electrode and that an opposite reaction must take place at the other electrode. A presently preferred redox couple is an aqueous solution of NaOH.

Examples of suitable gel electrolytes are, for example, aqueous solutions of NaOH and Knox ® gelatin.

In one preferred embodiment, the electrolyte is a solid electrolyte system comprising a combination of a ionomer or polymer solvated with a liquid electrolyte material, capable of redox chemistry.

Examples of suitable materials are, for example, the lithium sulfonate form of Nafion ® and polyhydroxyethylmethylacrylate (HEMA). Presently, the preferred method of utilizing these materials is by casting them directly onto the first electrode and then solvating them with a liquid electrolyte. It is understood, however, that other techniques for using these solid-type electrolytes in the instant invention known in the art may also be used.

CONTAINING MEANS

A containing means is provided for containing the electrolyte in proper intimate contact with the electrodes. Suitable examples of materials useful as the containing means for the electrolyte are, for example, glass, ceramic, metal, coated metal, fluorinated ethylene-propylene resin (FEP), polyvinylidene difluoride (PVDF), tetrafluoroethylene (TFE), glass fiber filled resin, polyvinyl chloride (PVC), post-chlorinated polyvinyl chloride (CPVC), plastic, and combination thereof. Examples of metals suitable for use include stainless steel, aluminum, and titanium. Examples of coated metals suitable for use include, for example, steel coated with PVC, aluminum coated with polyurethane elastomer and steel lined with glass fiber filled resin. As herein described, plastic means materials such as thermoplastic, polyurethanes, resins, elastomers, polyesters, nylons and nylon-type materials.

RECEIVING MEANS

The electricity produced may be collected and/or used by methods known in the art. For example, the electricity produced may be used directly in an electrical circuit. Alternatively, the electricity may be stored, for example, in a chemical storage battery. The photoelectrochemical (PEC) cells may also be used to produce chemicals, fuels and/or chemical energy by methods known and practiced in the art.

The energy level relationships at the interface between a semiconductor electrode and the electrolyte solution are shown schematically in FIG. 3. Energy levels of the electrodes shown there, measured against a reference are $E_f$, the Fermi level, and $E_{cb}$ and $E_{vb}$, the lowest lying energy level of the conduction band and the highest lying level of the valence band of the semiconductor, respectively. The energy band gap of the semiconductor is represented by $E_{bg}$.

Absorption of light by the semiconductor of an energy corresponding to $E_{bg}$ promotes an electron from the valence band to the conduction band and the subsequent separation of electron/electron hole pairs. In n-type titanium dioxide, the energy band gap is normally about 3 eV, corresponding to a light absorption edge of about 400 nanometers wavelength. In the photoactive true solid/solid solution semiconductor electrodes of the present invention, this absorption edge can be shifted as desired anywhere from the infrared region through the visible light region and into the ultraviolet region, thus making these electrodes responsive to any area of the electromagnetic spectrum desired for a particular utilization. Currently, of course, the most important adaptation is one in which the band gap is modified to be approximately 1.4 eV corresponding to a light absorption edge of about 800 nanometers representing the area of greatest energy output of the solar spectrum.

In an n-type photoactive material, for example, photogenerated electrons promoted to the conduction band migrate through the semiconductor while the corresponding electron holes tend to migrate to the electrode/electrolyte interface. If the reduction-oxidation potential, $E_{redox}$, of the electrolyte solution or of some solid species is more negative than $E_{vb}$, interfacial electron transfer can occur to fill the electron holes, simultaneously oxidizing the solvent or solute species. Oxidation of the semiconductor material itself may also occur if the potential for anionic dissolution, $E_d$, of the material is more negative than $E_{vb}$. Whether oxidation of some electrolytic species or the semiconductor material itself is the predominating reaction at the illuminated electrode depends upon the relative surface rates of the two reactions.

If $E_d$ is more negative than $E_{redox}$, then the oxidized form of the electrolyte species once formed by the photoassisted oxidation reaction is capable of oxidizing the semiconductor material and the electrode surface may be corroded. The choice of modifying oxide (component b) may be thus governed in part by the relative values of $E_d$ for the material and $E_{redox}$ for the oxidation reaction in which the modified type true solid/solid solution electrode is to be employed.

For purposes of clarity, several embodiments will be used to illustrate the method of making said true solid/solid solution semiconductor mixed metal oxide material useful in the instant invention. However, these embodiments are in no way limiting nor are they the only possible methods of producing said true solid/solid photoactive semiconductor mixed metal oxide material. These particular embodiments are as follows:

1

Photoactive semiconductor materials of the formula $SrTi_{1-x}Rh_xO_3$ were prepared as follows:

Strontium/Titanium Stock Solution: 147.6 g (1 mole) of $SrCO_3$ (reagent grade) was dissolved in approximately 600 mls of a solvent solution having a ratio (vol/vol) of 1 part concentrated aqueous HBr to 4 parts deionized water. When dissolution of the $SrCO_3$ was complete, 227.9 g (1 mole) of $Ti(C_2H_5O)_4$ (reagent grade) was added and mixed until complete dissolution, enough additional solvent solution was added to make 1 liter. A clear, yellow solution which keeps for 6 to 7 days at room temperature resulted. It is important to dissolve the $SrCO_3$ in most of the solvent solution first to help keep the $Ti(C_2H_5O)_4$ from precipitating the Ti out as $TiO_2$ immediately.

Strontium/Rhodium Stock Solution: 1.84 g (0.0125 mole) of $SrCO_3$ (puratronic grade) and 3.29 g (0.0125 mole) of $RhCl_3\cdot 3H_2O$ (reagent grade) was dissolved and diluted to 1 liter volume in a solvent solution having a ratio (vol/vol) of 1 part concentrated aqueous HBr, 1 part isopropyl alcohol and 6 parts deionized water. The resulting solution was stored in a freezer at $-10°$ C. This solution seems to store indefinitely at this temperature. Inductively coupled plasma confirmed a Sr to Rh ratio of 1:1.

Five true solid/solid solution photoactive materials with differing amounts of Ti and Rh as shown in Table 1 were prepared by (a) intimately mixing the appropriate amounts of the Strontium-Rhodium and Strontium-Titanium solutions and (b) precipitating the metals by adding a solution containing 150 g of $NH_4HCO_3$, 80 ml of aqueous concentrated $NH_3$ and 100 ml of deionized water. The resulting precipitate containing solution was centrifuged in an International Equipment Co. Model EXD centrifuge at a setting of 50 and the resulting supernatant removed by decanting. The precipitates were placed in alumina crucible with lids and were annealed in a Blue "M" box-type muffle furnace to approximately 600° to 800° C. at a rate of about 100° C./hour in an air atmosphere. The resulting solid/solid solution mixed metal oxides were allowed to cool and were stored in polyethylene bottles.

TABLE 1

| Sample No. | Stock Solution Sr—Ti (ml) | Stock Solution Sr—Rh (ml) | x (%)* |
|---|---|---|---|
| 1a | 60 | 240 | 4.8 |
| 1b | 200 | 180 | 1.1 |
| 1c | 200 | 120 | 0.74 |
| 1d | 200 | 90 | 0.56 |
| 1e | 200 | 45 | 0.28 |

*The value of x is a nominal value which, due to a number of possible loss mechanisms (i.e., metal staying in solution, precipitate too fine to bring down during centrifuging, vaporization, etc.), may be altered as to the actual final metal mole ratio.

2

Photoactive semiconductor materials of the formula $SrTi_{1-x}Rh_xO_3$ were prepared as follows:

Strontium/Titanium Stock Solution: 73.8 g (½ mole) of $SrCO_3$ (reagent grade) were dissolved in approximately 600 ml of a solvent solution having a ratio (vol/vol) of 1 part concentrated aqueous HBr to 4 parts deionized water. When dissolution of the $SrCO_3$ was complete, 113.95 g (½ mole) of Ti(C$_2$H$_5$O)$_4$ (reagent grade) was added and mixed until complete dissolution, enough additional solvent solution was added to make 1 liter.

Three solid/solid solution photoactive materials with differing amounts of Ti and Rh, as shown in Table 2, were prepared by (a) intimately mixing the appropriate amounts of the strontium-titanium stock solution of Example 2 with appropriate amounts of the strontium-rhodium stock solution of Example 1 and (b) precipitating the metals by adding a solution containing 150 g of NH$_4$HCO$_3$, 80 ml of aqueous concentrated NH$_3$ and 100 ml of deionized water. The resulting precipitate containing solution was centrifuged in an International Equipment Co. Model EXD centrifuge at a setting of 50 for approximately 20 minutes, and the supernatant was then removed by decanting. The remaining precipitate cake was desicated at about 95° C. under vacuum for 24 to 72 hours. The cake was placed in a Coors porcelain crucible and was then annealed in air in a Blue "M" box-type muffle furnace for approximately 10 hours at about 600° C., cooled and stored in a polyethylene bottle. These materials were then pressed in a hydraulic press, placed in a platinum foil cup and then fired in a Deltec Horizontal 1½" OD tube furnace using commercial 99.8 percent Al$_2$O$_3$ 1½" OD by 1 meter tubes from Coors Porcelain Co. in an oxygen atmosphere of 200 cc/min brought to 1650° C. The temperature was raised from room temperature at a rate of about 200° C./24 hours and then held at 1650° C. for approximately 2 hours. The materials were then cooled at a rate of approximately 400° C./hour in an O$_2$ atmosphere.

TABLE 2

| Sample No. | Stock Solution Sr—Ti (ml) | Stock Solution Sr—Rh (ml) | x (%)* |
| --- | --- | --- | --- |
| 2a | 400 | 40 | 0.25 |
| 2b | 400 | 16 | 0.10 |
| 2c | 200 | 0 | 0 |

*The value of x is a nominal value which, due to a number of possible loss mechanisms (i.e., metal staying in solution, vaporization, etc.), may be altered as to the actual final metal mole ratio.

3

Three true solid/solid solution photoactive materials for SrTi$_{1-x}$Rh$_x$O$_3$, with varying values of x as shown in Table 3, were prepared following the procedure of Example 2. These three materials were then tested for their light absorption edge using a Gilford Industries Photoacoustic Spectrometer. The samples were scanned from 350 nanometers to 2500 nanometers using a Xenon arc source and a ZnSe standard reference. The shift of the absorption edge with change in the amount of rhodium present is shown in FIG. 4. The absorption edge data for SrTiO$_3$ was normalized from data in "Fundamental Absorption Edge of SrTiO$_3$," Redfield, D. and Burke, William J., *Physical Review B*, Vol. 6, No. 8, Oct. 15, 1972.

TABLE 3

| Sample No. | Ti (%) | Rh (%) |
| --- | --- | --- |
| 3a | 80 | 20 |
| 3b | 90 | 10 |
| 3c | 96 | 4 |
| 3d | 100 | 0 |

4

A true solid/solid solution photoactive material of the form SrTi$_{0.86}$Ru$_{0.14}$O$_3$ was prepared following the procedure of Example 1. This material was mixed with 1 percent Ta (as the alkoxide), pressed into a disc and heated following the procedure of Example 2. The photocurrent (A/m$^2$) of this disc was determined from 350 nanometers to 750 nanometers. The values were determined by sequentially placing a series of sharp-cut, long pass, glass, 2"×2" filters, supplied by the Schott Glass Co., between the Xenon arc light source and the true solid/solid solution photoactive material to change the spectral output of this Xenon arc light source. This resulted in changing the spectral output of this Xenon arc light source from one which closely approximates the solar spectrum to one which contains only infrared wavelengths. The photocurrent (mA/cm$^2$) was measured with each separate filter in the series between said source and said photoactive material. The testing was done on an optical bench using a solar cell made up of: (1) n-type electrode of SrTi$_{0.86}$Ru$_{0.18}$O$_3$ material of the instant invention on a titanium metal substrate; (2) a graphite counter electrode; (3) a graphite container and (4) an electrolyte consisting of an aqueous 1 KCl solution.

The results are compared graphically in FIG. 5. A normalized spectral response curve for SrTiO$_3$ taken from data in "Fundamental Absorption Edge of SrTiO$_3$," Redfield, D. and Burke, William J., *Physical Review B*, Vol. 6, No. 8, Oct. 15, 1972 is also presented.

Thus, an illustrative embodiment of a liquid-junction semiconductor photoelectrochemical cell (PEC) of the present invention may be assembled by first inserting a film electrode made of a titanium metal substrate and a semiconductor mixed metal oxide layer of SrTi$_{0.95}$Pt$_{0.05}$O$_3$ on the floor of a containing means made from fluorinated ethylene-propylene resin (FEP). An electrolyte made of 1 M KOH aqueous solution saturated with air is then placed in the containing means. A second electrode made up of La$_{0.01}$Sr$_{0.99}$SnO$_3$ disposed on a glass substrate placed over and in contact with the electrolyte and seal the containing means. When this embodiment of the PEC is outfitted with suitable electrical contacts and measuring equipment and exposed to sunlight, it will be found to generate an electrical current utilizing electromagnetic energy from the visible light region of the solar spectrum.

While there has been shown and described what is believed at present to constitute the preferred embodiments of the present invention, it will be obvious to those skilled in the art that various changes and modifications may be made therein without departing from the scope of the invention as defined by the appended claims.

What is claimed is:

1. A liquid-junction photoelectrochemical semiconductor cell adapted for producing electricity, fuel, chemicals and/or chemical energy by use of light radiation comprising:

(I) a first electrode comprising: a bulk or film electrode comprising a photoactive true solid/solid solution semiconductor material having a band gap of approximately 1.4 eV and which, in the case of a film electrode, is disposed on a supporting electrically conductive substrate;

(II) a second electrode comprising: a semiconductive or conductive layer which is transparent to radiation of energy corresponding to the band gap of said first electrode (I), and which is disposed on a supporting conductive substrate, wherein said substrate also is transparent to radiation of energy corresponding to the band gap of component (I), further characterized in that said second electrode, if a semiconductor, is of opposite conductivity type in relation to said first electrode;

(III) an electrolyte disposed between, and in intimate contact with, both components (I) and (II);

(IV) a means for receiving the electrical energy produced;

wherein component (I) is further characterized in that said semiconductor material thereof is a photoactive true solid/solid solution mixed metal oxide semiconductor material derived from precursor substances selected from the group consisting of elemental metals, non-oxide metal compounds, and mixtures thereof; said phhotoactive true solid/solid solution mixed metal oxide semiconductor material corresponding to the formula $A_r{}^{va}M_y{}^{vm}O_z{}^{-2}$; where said formula represents the stoichiometry of the basic repeating unit lattice cell; where M is the combination of component (a) metal and component (b) metal; A when present is at least one different metal which does not substantially alter the optical absorption accruing from M in the above formula; O represents oxygen, said formula being further characterized in that r, y, z, va and vm are defined by the relationship $va(r)+vm(y)=2z$, wherein r equals a value of from 0 to 2, y is from 1 to 2, inclusive, z is from 1 to 7, inclusive, va equals the positive valence of A, vm equals the positive mean valence of M, and the valence of oxygen is $-2$; and wherein all said metal components of said formula are selected from the group consisting of boron, aluminum, tin, lead, the transition metals of families 1b through 7b, inclusive, and 8 of the periodic table of elements, and the lanthanide series; wherein M in the above formula comprises:

(a) 50 to 99.9 mole percent, based on the total metals mole fraction, of one or more component (a) metals; and (b) 0.1 to 50 mole percent, based on the total metals mole fraction, of one or more component (b) metals;

with the proviso that said component (b) metals are different than said component (a) metals and with the further proviso that said component (a) metals, when in comparable oxide form, have a larger band gap that said component (b) metals, when said component (b) metals are in their comparable oxide form; wherein said photoactive true solid/solid solution mixed metal oxide material's optical absorption edge is thereby optimized to approximately 1.4 eV.

2. A photoelectrochemical cell as claimed in claim 1 wherein said electrolyte is maintained in intimate contact with said electrodes by immersion of said electrodes in said electrolyte.

3. A photoelectrochemical cell as claimed in claim 2 wherein said electrolyte is selected from the group consisting of liquids, sols and gels.

4. A photoelectrochemical cell as claimed in claim 1 wherein said component III is a solid electrolyte system comprising an ionomer or polymer solvated with a liquid electrolyte capable of redox chemistry.

5. A photoelectrochemical cell as claimed in claim 1 wherein said electrolyte is an aqueous redox couple in a solvent.

6. A photoelectrochemical cell as claimed in claim 1 wherein a containing means is provided to contain said electrolyte.

7. A photoelectrochemical cell as claimed in claim 6 wherein said containing means is selected from the group consisting of glass, ceramic, metals, coated metals, plastic, a glass fiber filled resin material and combinations thereof.

8. A photoelectrochemical cell as claimed in claim 6 wherein said containing means is selected from the group consisting of a tetrafluoroethylene (TFE), a polyvinyl chloride (PVC) and a post-chlorinated polyvinyl chloride (CPVC).

9. A photoelectrochemical cell as claimed in claim 1 wherein said means for receiving said electrical energy is selected from the group consisting of an electrical circuit, a storage means and combinations thereof.

10. A photoelectrochemical cell as claimed in claim 9 wherein said storage means is a battery.

11. A photoelectrochemical cell as claimed in claim 1 wherein for said formula of component I semiconductor material, r is 0, y is 1, z is 2 and the final oxide corresponds to the formula $MO_2$.

12. A photoelectrochemical cell as claimed in claim 1 wherein for said formula of component I semiconductor material, r is 1, y is 1, z is 3 and the final oxide compound corresponds to the formula $AMO_3$.

13. A photoelectochemical cell as claimed in claim 1 wherein for said formula of component I semiconductor material, r is 2, y is 2, z is 7 and the final oxide compound corresponds to the formula $A_2M_2O_7$.

14. A photoelectrochemical cell as claimed in claim 1 wherein for said formula of component I semiconductor material, r is 0, y is 2, z is 3 and the final oxide compound corresponds to the formula $M_2O_3$.

15. A photoelectrochemical cell as claimed in claim 1 wherein for said formula of component I semiconductor material, r is 0, y is 1, z is 1 and the final oxide compound corresponds to the formula $MO$.

16. A photoelectrochemical cell as claimed in claim 1 wherein for said formula of component I semiconductor material, A is a single metal selected from the group consisting of strontium, zinc and the lanthanides.

17. A photoelectrochemical cell as claimed in claim 1 wherein for said formula of component I semiconductor material, A is a combination of from 2 to 3 different metals selected from the group consisting of strontium, zinc and the lanthanides.

18. A photoelectrochemical cell as claimed in claim 1 wherein for said formula of component I semiconductor material, M is a combination of two different metals selected from the group consisting of boron, aluminum, tin, lead, the lanthanide series and the transition metals.

19. A photoelectrochemical cell as claimed in claim 1 wherein for said formula of component I semiconductor material, M is a combination of titanium and a metal selected from the group consisting of Rh, Ru, Ir, Mn, Cr, Fe, V and Pt.

20. A photoelectrochemical cell as claimed in claim 1 wherein for said formula of component I semiconductor material, M is a combination of aluminum and a metal selected from the group consisting of Rh, Ru, Ir, Mn, Cr, Fe, V and Pt.

21. A photoelectrochemical cell as claimed in claim 1 wherein for said formula of component I semiconductor material, M is a combination of Ru or Rh and one metal selected from the group consisting of niobium, lanthanum, tantalum, tin, titanium and zirconium.

22. A photoelectrochemical cell as claimed in claim 1 wherein for said formula of component I semiconductor material, M is a combination of 3 to 4 different metals characterized in that one metal is selected from the grup Al, Nb, La, Ta, Sn, Ti and Zr and the remaining different metals are selected from the group consisting of Ir, Mn, Cr, Fe, V, Pt, Rh and Ru.

23. A photoelectrochemical cell as claimed in claim 1 wherein said substrate of component II is selected from the group consisting of glass, tetrafluoroethylene (TFE), PVC, CPVC, fluorinated ethylene-propylene resin (FEP), polyvinylidene difluoride (PVDF), poly-(methylmethacrylate)-type polymers, silicone, silicates, transparent inorganic materials, transparent organic materials or combinations thereof.

24. A photoelectrochemical cell as claimed in claim 1 wherein said substrate of component I is selected from the group consisting of a valve metal, a precious metal, other suitable metal, ceramic, glass and combinations thereof.

25. A photoelectrochemical cell as claimed in claim 1 wherein said substrate of component I is selected from the group consisting of titanium, zirconium and tin.

26. A photoelectrochemical cell as claimed in claim 1 wherein said component I is a bulk electrode of said photoactive true solid/solid semiconductor mixed metal oxide material.

27. A photoelectrochemical cell as claimed in claim 1 wherein said electrolyte is an aqueous solution of NaOH saturated with oxygen.

28. A photoelectrochemical cell as claimed in claim 1 wherein said first electrode comprises a single layer of said true solid/solid solution metal oxide material.

29. A photoelectrochemical cell as claimed in claim 1 wherein said first electrode comprises at least two layers of said true solid/solid solution metal oxide material.

30. A photoelectrochemical cell as claimed in claims 1 or 2 wherein component IV is one or more means selected from the group consisting of a means for collecting the fuel produced, a means for collecting the chemical energy produced and a means for collecting chemicals produced.

* * * * *